United States Patent
Fratti et al.

(10) Patent No.: US 7,280,816 B2
(45) Date of Patent: Oct. 9, 2007

(54) TECHNIQUES FOR MONITORING MOBILE TELECOMMUNICATIONS FOR SHARED ACCOUNTS

(75) Inventors: Roger A. Fratti, Mohnton, PA (US); Deborah A. Hampton, Stewartsville, NJ (US)

(73) Assignee: Agere Systems Inc., Allentown, PA (US)

( * ) Notice: Subject to any disclaimer, the term of this patent is extended or adjusted under 35 U.S.C. 154(b) by 71 days.

(21) Appl. No.: 11/022,159

(22) Filed: Dec. 23, 2004

(65) Prior Publication Data

US 2006/0141994 A1    Jun. 29, 2006

(51) Int. Cl.
*H04M 11/00* (2006.01)
(52) U.S. Cl. ............ 455/405; 455/407; 455/420; 379/114.01; 379/114.05; 370/328
(58) Field of Classification Search ............ 455/405, 455/407, 41.2, 420, 558, 408, 406; 370/335, 370/338, 328; 379/114.01, 114.05
See application file for complete search history.

(56) References Cited

U.S. PATENT DOCUMENTS

| | | | | |
|---|---|---|---|---|
| 6,041,229 A | * | 3/2000 | Turner | 455/420 |
| 6,792,280 B1 | * | 9/2004 | Hori et al. | 455/517 |
| 6,987,844 B2 | * | 1/2006 | Himmel et al. | 379/114.2 |
| 2002/0111179 A1 | * | 8/2002 | Tanaka et al. | 455/517 |
| 2003/0109271 A1 | * | 6/2003 | Lewis et al. | 455/517 |
| 2003/0119554 A1 | * | 6/2003 | Horn | 455/558 |
| 2003/0141361 A1 | * | 7/2003 | Nguyen et al. | 235/380 |
| 2004/0209622 A1 | * | 10/2004 | Kotzin | 455/452.1 |

* cited by examiner

*Primary Examiner*—Danh Le (57) ABSTRACT

The present invention provides techniques for monitoring mobile communications. In one aspect, a method of monitoring mobile telephone usage is provided. The method comprises the step of relaying usage information pertaining to one or more mobile telephones to one or more other mobile telephones.

20 Claims, 5 Drawing Sheets

FIG. 8
800 ically, user 102 uses mobile telephone 106 to
TECHNIQUES FOR MONITORING MOBILE TELECOMMUNICATIONS FOR SHARED ACCOUNTS

FIELD OF THE INVENTION

The present invention relates generally to telecommunications, and more particularly to techniques for monitoring telecommunications usage.

BACKGROUND OF THE INVENTION

With the increasing use of wireless communications, usage regulation has surfaced as a primary concern. Service providers commonly charge a usage fee that can increase when a user exceeds a certain allotted number of minutes included in a calling plan. These fee increases can be disproportionally high compared to the base price of the calling plan.

While a single user might be able to monitor the usage on his or her own personal mobile telephone, many service providers now offer shared plans wherein multiple users operate multiple phones, all linked to a single account. Further, with many of these plans, a certain number of allotted minutes are shared by all the users. For example, parents might participate in a shared family-type plan and provide mobile telephones to each of their children.

A problem with such a system is, with each user operating independently of other users, that control over usage may be lost and over-use charges might be incurred for exceeding the overall allotted minutes for the plan. These over-use charges can be exorbitantly high.

Therefore, techniques for monitoring usage in such shared plans would be beneficial.

SUMMARY OF THE INVENTION

The present invention provides techniques for monitoring mobile communications of multiple users associated with a shared account. In one aspect of the invention, a method of monitoring mobile telephone usage is provided. The method comprises the step of relaying usage information pertaining to one or more mobile telephones to one or more other mobile telephones.

A more complete understanding of the present invention, as well as further features and advantages of the present invention, will be obtained by reference to the following detailed description and drawings.

DETAILED DESCRIPTION

Figure 1:
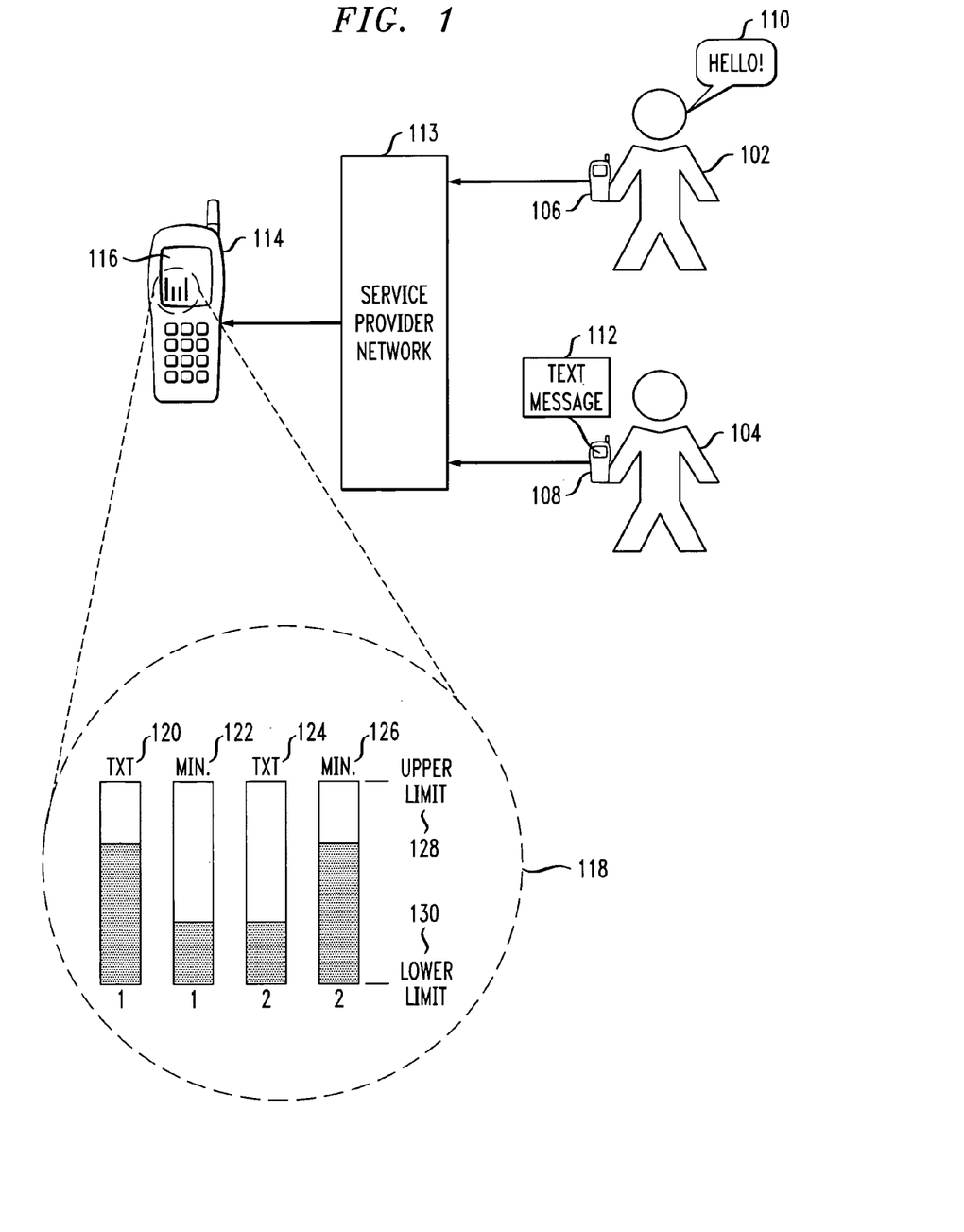
FIG. 1 is a diagram illustrating an exemplary technique for monitoring mobile telephone usage.

FIG. 1 is a diagram illustrating an exemplary technique for monitoring mobile telephone usage. In FIG. 1, users 102 and 104 operate mobile telephones 106 and 108, respectively. Specifically, user 102 uses mobile telephone 106 to place a call 110 and user 104 uses mobile telephone 108 to send a text message 112.

Usage information regarding call 110 and text message 112 is conveyed to mobile telephone 114, e.g., via service provider network 113. This usage information may comprise one or more of use duration and/or count, minutes remaining in calling plan, text message content, telephone numbers to which calls were placed, telephone numbers from which calls were received, telephone numbers and/or electronic mail addresses to which text messages were sent, telephone numbers and/or electronic mail addresses from which text messages were received. As will be described in detail below, the information that is conveyed to mobile telephone 114 may be based, at least in part, on preferences of a user of mobile telephone 114.

According to the exemplary embodiment shown in FIG. 1, mobile telephones 106, 108 and 114 are all linked to the same account with the service provider. More specifically, mobile telephone 114 comprises the primary account and mobile telephones 106 and 108 comprise sub-accounts. The present teachings should, however, not be limited to any particular number of primary and/or secondary accounts. By way of example only, as will be described in detail below, more than one mobile telephone might comprise the primary account. As used herein, the term "primary account" denotes an account associated with the phone and phone number of the billing statement. The term "sub-account" denotes phones and phone numbers also associated with the same billing statement, but are secondary in nature, e.g., as assigned by the service provider.

Mobile telephone 114 includes display 116. Portion 118 of display 116 may comprise a graphic representation of usage information for the one or more mobile telephones in the account. For example, the graphic representation may comprise bar charts 120 and 122 which indicate usage information, e.g., text messaging usage and talk time, respectively, for mobile telephone 106, and bar charts 124 and 126 which indicate usage information, e.g., text messaging usage and talk time, for mobile telephone 108. While FIG. 1 depicts displaying text messaging and talk time usage information, as described above other usage information may be provided.

Further, the graphic representation might indicate how much of an allotted usage remains for a given billing period, e.g., number of talk time minutes remaining in a month before over-use charges are incurred. For example, according to the depiction of a graphic representation in FIG. 1, upper limit indicium 128 and lower limit indicium 130 indicate that mobile telephone 106 has less text messaging usage but more talk time remaining than mobile telephone 108. According to an exemplary embodiment, indicia 128 and 130 are variable and may be based, at least in part, on the service plan provided by the service provider. Additionally, the user might be able to program in and/or alter these indicia on the display.

Typically, text messaging usage is based on the number of text messages sent in a given billing period, i.e., in a month. For example, a base plan might allow 100 text messages a month. For each message over 100, the account is charged a fee, e.g., ten cents.

While FIG. 1 shows the graphic representation comprising a bar chart-type configuration, it is to be understood that the graphic representation may comprise any suitable configuration for conveying usage information to a human user of mobile telephone 114. For example, suitable graphic representations include, but are not limited to, bar charts, pie charts, graphs, tables, numerical displays and combinations comprising at least one of the foregoing graphic representations.

Further, the usage information may be conveyed to the user of mobile telephone 114 through an audio interface, either in conjunction with, or in place of, the graphic representation. An audio interface is particularly useful in instances when the user is unable to look at display 116, for example, when driving, or if the user is sight impaired. According to the techniques presented herein, any audio interfaces suitable for conveying usage information to the user may be employed, including, but not limited to, spoken words, tones, audible code and combinations comprising at least one of the foregoing audio interfaces.

The user may also define how the usage information is presented to them. For example, the user might first select that a graphic representation of the usage information be employed. The user might then select a bar chart configuration, such as that shown depicted in FIG. 1. Alternatively, if the user selects an audio interface, the user might then select that usage information be conveyed to them by spoken English words. The options available for selection by the user may comprise template configurations, for example, created by the mobile telephone manufacturer or supplied by the service provider. Further, according to the teachings presented herein, the user enters her preferences directly into her mobile telephone, or alternatively, the user might contact the service provider and convey her preferences to them. The service provider can then configure the user's mobile telephone to reflect those preferences.

The user may also dictate what usage information is to be provided. For example, the user might be concerned only about text messaging usage, and thus would request that only usage information relating to text messaging be conveyed to them. Similarly, the user might be concerned only with the usage of one particular mobile telephone in the account. The user could then request that only usage information for that one mobile telephone be conveyed to them.

Figure 2:
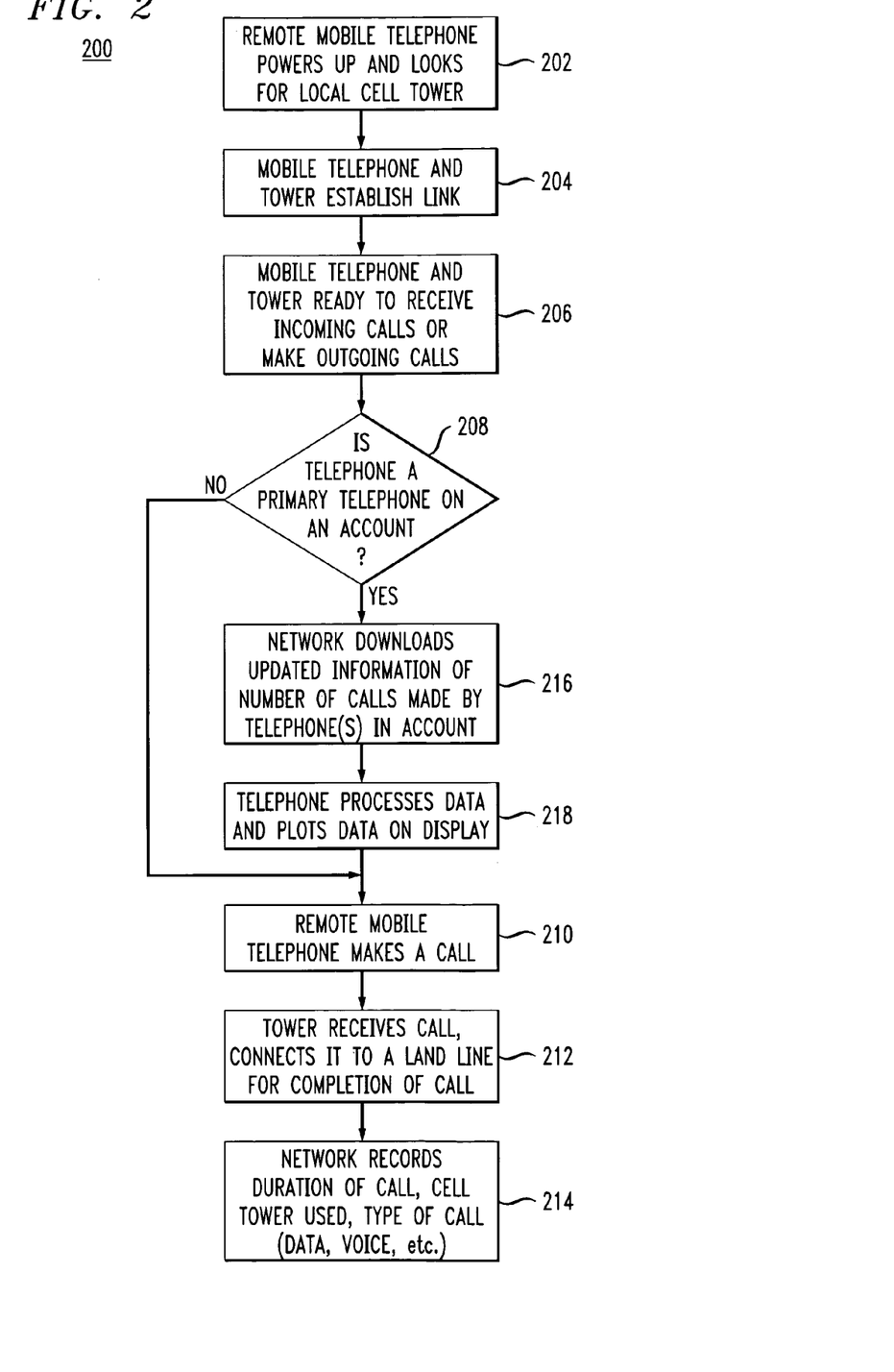
FIG. 2 is a flowchart illustrating an exemplary methodology for monitoring mobile telephone usage.

FIG. 2 is a flowchart illustrating an exemplary methodology for monitoring mobile telephone usage. In step 202 of exemplary methodology 200, a mobile telephone is powered up, e.g., turned on, and scans for a signal from a local cellular tower. In step 204, the establishment of a link between the mobile telephone and a particular tower allows a service provider, e.g., through service provider network 113, described in conjunction with the description of FIG. 1, above, to be informed of the presence, such as, location and activity, of the mobile telephone. The service provider may also gain account information regarding the mobile telephone. See, for example, step 208, below. In step 206, the mobile telephone and the tower are ready to receive incoming calls or make outgoing calls.

In step 208, the service provider, as described, for example, in step 204, above, can gain account information regarding the mobile telephone. Namely, the service provider can establish whether or not the mobile telephone is a primary telephone on any accounts. For example, a mobile telephone may be identified as a primary telephone in an account by a flag set in the accounting records of the service provider.

If the mobile telephone is determined by the service provider to not be a primary telephone in any account, the mobile telephone, as shown in step 210 may then be used, e.g., to place a call. In step 212, the tower receives the call and connects it to a land line for completion. In step 214, the service provider, through the service provider network, records usage information for the mobile telephone which is ultimately used for billing purposes. Further, as described below, if the service provider detects a primary telephone on the account, it may relay this usage information to that primary telephone. The usage information recorded by the service provider may include, for example, the usage information described in conjunction with the description of FIG. 1, above.

If, however, the mobile telephone is determined by the service provider to be a primary telephone in an account, the service provider, through the service provider network, will download updated usage information data regarding one or more of the telephones in that account, as in step 216. What information is downloaded and for which particular telephones in the account may be based on preferences of the user of the mobile telephone, see description of FIG. 1, above. In step 218, the mobile telephone processes the usage information data and plots the data on the mobile telephone display, for example, as shown in FIG. 1.

The mobile telephone may then be used to place a call, as in steps 210 and 212, described above, and the usage information maybe recorded, as in step 214, described above.

Figure 3:
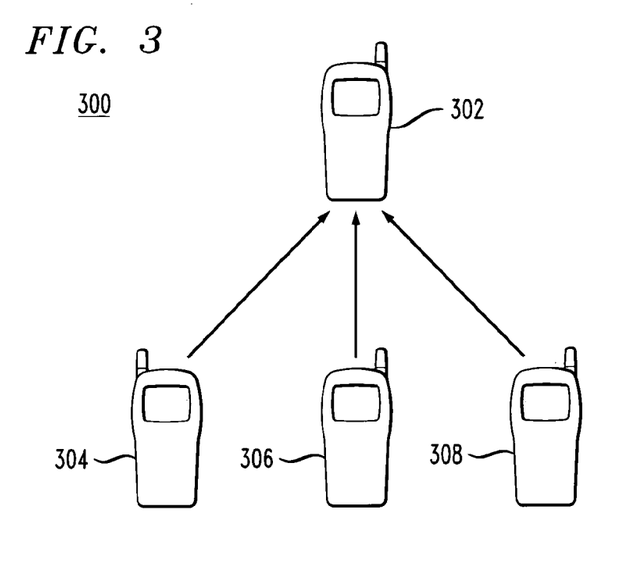
FIG. 3 is a diagram illustrating an exemplary mobile telephone usage information system.

FIG. 3 is a diagram illustrating an exemplary mobile telephone usage information system, e.g., system 300. In system 300, there are four mobile telephones linked to one account, i.e., mobile telephones 302, 304, 306 and 308. According to the configuration shown in FIG. 3, mobile telephone 302 comprises a primary account and mobile telephones 304, 306 and 308 comprise sub-accounts.

In system 300, usage information pertaining to mobile telephones 304, 306 and 308 is transmitted, via a service provider network (not shown), to mobile telephone 302. The usage information then may be conveyed to a user of mobile telephone 302, e.g., according to the techniques described in conjunction with the description of FIG. 1, above.

Figure 4:
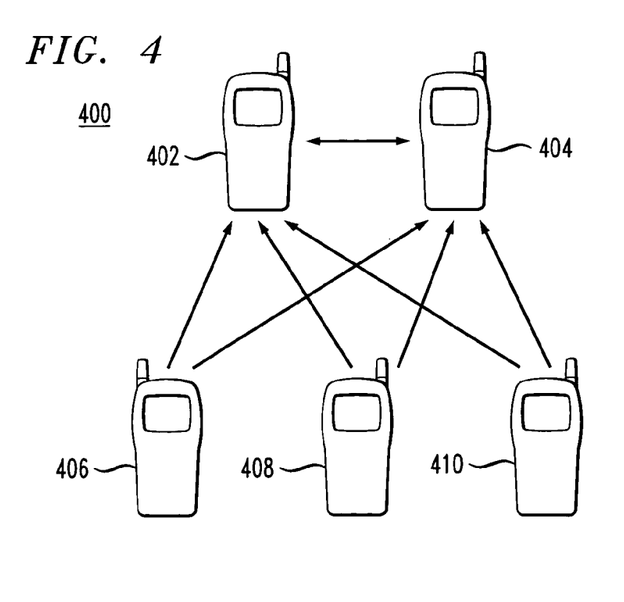
FIG. 4 is a diagram illustrating another exemplary mobile telephone usage information system.

FIG. 4 is a diagram illustrating another exemplary mobile telephone usage information system, e.g., system 400. In system 400 there are five mobile telephones linked to one account, i.e., mobile telephones 402, 404, 406, 408 and 410. According to the configuration shown in FIG. 4, mobile telephones 402 and 404 comprise primary accounts and mobile telephones 406, 408 and 410 comprise sub-accounts. Thus, more than one primary account may exist.

In system 400, usage information pertaining to mobile telephones 406, 408 and 410 is transmitted, via a service provider network (not shown), to mobile telephones 402 and 404. Further, usage information pertaining to mobile telephone 404 may similarly be transmitted to mobile telephone 402, and vice versa. By way of example only, system 400 may be used by families, wherein usage information from children is transmitted to both parents. Additionally, this configuration allows the parents to share usage information with each other.

Figure 5:
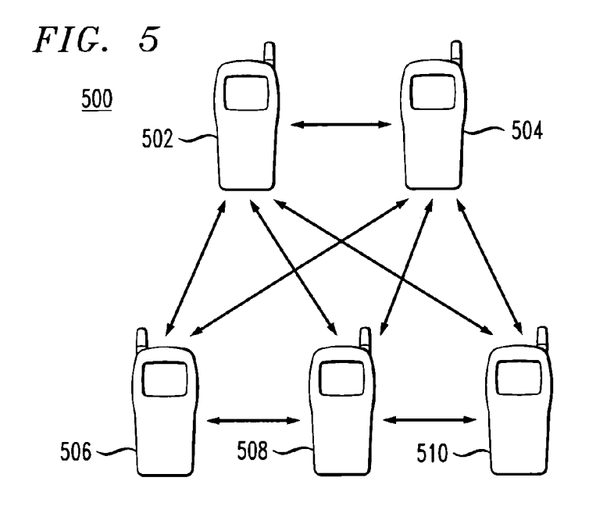
FIG. 5 is a diagram illustrating yet another exemplary mobile telephone usage information system.

FIG. 5 is a diagram illustrating yet another exemplary mobile telephone usage information system, e.g., system 500. In system 500 there are five mobile phones linked to one account, i.e., mobile telephones 502, 504, 506, 508 and 510. According to the configuration shown in FIG. 5, each mobile telephone in system 500 transmits usage information, via a service provider network (not shown), to all other mobile telephones in system 500. Therefore, in contrast to the systems shown in FIGS. 3 and 4, there are no sub-accounts in system 500. By way of example only, system 500 may be used by employees of a company sharing minutes on a single plan.

Figure 6:
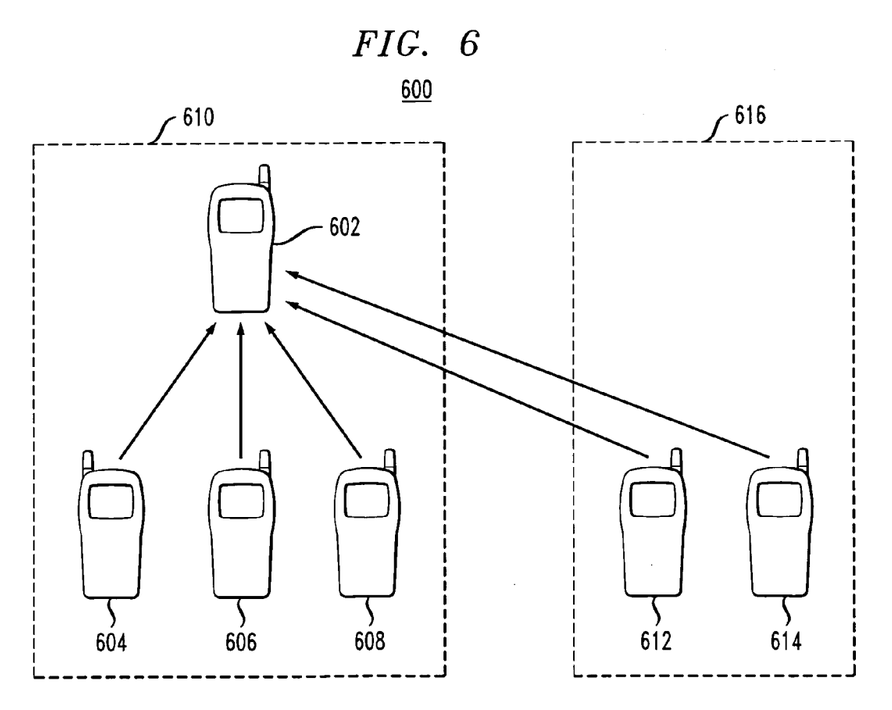
FIG. 6 is a diagram illustrating a further exemplary mobile telephone usage information system.

FIG. 6 is a diagram illustrating a further exemplary mobile telephone usage information system, e.g., system 600. In system 600, there are four mobile telephones, e.g., mobile telephones 602, 604, 606 and 608, linked to one account, e.g., account 610, and two mobile telephones, e.g., mobile telephones 612 and 614, linked to another account, e.g., account 616.

With regard to account 610, mobile telephone 602 comprises a primary account and mobile telephones 604, 606 and 608 comprise sub-accounts. With regard to account 616, there are no sub-accounts. However, usage information from mobile telephones 612 and 614 is transmitted to mobile telephone 602 of account 610, via a service provider network (not shown). By way of example only, system 600 may be used by families having more than one account, and wherein one parent monitors usage of all accounts.

Figure 7:
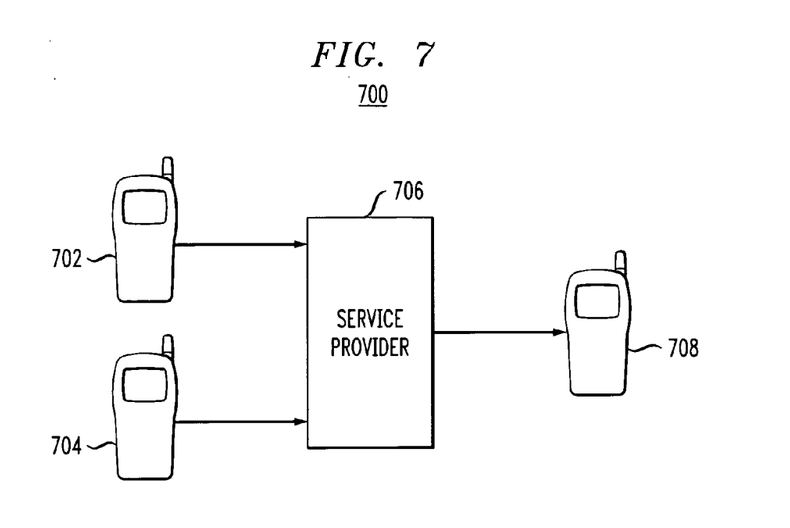
FIG. 7 is a diagram illustrating an exemplary system for relaying mobile telephone usage information to a user.

FIG. 7 is a diagram illustrating an exemplary system for relaying mobile telephone usage information to a user. In system 700, usage information is transmitted from mobile telephones 702 and 704, both of which comprise sub-accounts of system 700, to service provider 706. Service provider 706 compiles the usage information and then transmits it to mobile telephone 708, which comprises the primary account of system 700.

According to an exemplary embodiment, the service provider monitors the usage for each mobile telephone in a given account. The service provider then relays the usage information it has collected to the one or more mobile telephones comprising primary accounts for that given account. Further, each mobile telephone linked to a particular account may have the capabilities of receiving usage information from the service provider, and it is up to the user or users of the account to determine which mobile telephones in the account will comprise primary accounts.

Usage information can be automatically sent to the mobile telephone of the primary account user by the service provider. This usage information is also preferably updated on a regular basis, allowing the user to, as will be described in detail below, selectively suspend service to high usage accounts. According to an exemplary embodiment, the user might receive usage information updates by keying a particular code into her mobile telephone. For example, the user might key *11 on her mobile telephone key pad which requests that the service provider relay account usage information to that mobile telephone.

According to another exemplary embodiment, account usage information is provided to a primary account user via the internet. For example, some mobile telephones are equipped with wireless access to the internet. Users of these mobile telephones might then log onto the internet through their telephones and receive usage information updates via the internet. For example, service providers might transmit, via the internet, alerts to the user that the usage for a particular account is high.

The user of a primary account may, e.g., based on the usage information transmitted to her, contact the service provider to suspend one or more services to one or more of the mobile telephones in the account. For example, the user of the primary account might, through monitoring usage, ascertain that the usage on one sub-account is disproportionally higher than on other sub-accounts, and request that the service provider temporarily or permanently suspend service for that high-use sub-account. Similarly, the user of the primary account might ascertain that the text messaging usage in one sub-account is high, but the talk time usage is low. The user might then have the service provider suspend only the text messaging service for that one sub-account.

Figure 8:
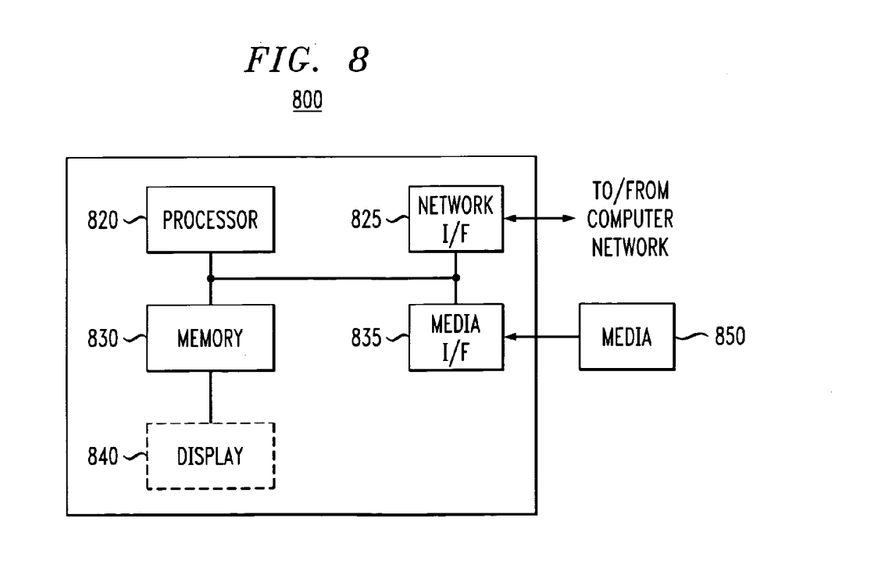
FIG. 8 is a diagram illustrating an exemplary system for performing one or more of the present methodologies.

FIG. 8 is a diagram illustrating an exemplary system for performing one or more of the present methodologies. Apparatus 800 comprises a computer system 810, e.g., a server operated by service provider 706, described in conjunction with the description of FIG. 7, above, that interacts with media 850. Computer system 810 comprises a processor 820, a network interface 825, a memory 830, a media interface 835 and an optional display 840. Network interface 825 allows computer system 810 to connect to a network while media interface 835 allows computer system 810 to interact with media 850, such as a Digital Versatile Disk (DVD) or a hard drive.

According to an exemplary embodiment, media 850 may comprise a source of preconfigured templates that the service provider supplies to users. For example, media 850 may comprise a graphic representation template that can be provided to the user which the user can implement and/or modify.

As is known in the art, the methods and apparatus discussed herein may be distributed as an article of manufacture that itself comprises a computer-readable medium having computer-readable code means embodied thereon. The computer-readable program code means is operable, in conjunction with a computer system such as computer system 810, to carry out all or some of the steps to perform one or more of the methods or create the apparatus discussed herein. For example, the computer-readable code is configured to implement a method of monitoring mobile telephone usage, by the step of: relaying usage information pertaining to one or more mobile telephones to one or more other mobile telephones.

The computer-readable medium may be a recordable medium (e.g., floppy disks, hard drive, optical disks such as a DVD, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk.

Memory 830 configures the processor 820 to implement the methods, steps, and functions disclosed herein. The memory 830 could be distributed or local and the processor 820 could be distributed or singular. The memory 830 could be implemented as an electrical, magnetic or optical memory, or any combination of these or other types of storage devices. Moreover, the term "memory" should be construed broadly enough to encompass any information able to be read from or written to an address in the addressable space accessed by processor 820. With this definition, information on a network, accessible through network interface 825, is still within memory 830 because the processor 820 can retrieve the information from the network. It should be noted that each distributed processor that makes up processor 820 generally contains its own addressable memory space. It should also be noted that some or all of computer system 810 can be incorporated into an application-specific or general-use integrated circuit.

Optional video display 840 is any type of video display suitable for interacting with a human user of apparatus 800. Generally, video display 840 is a computer monitor or other similar video display.

Although illustrative embodiments of the present invention have been described herein, it is to be understood that the invention is not limited to those precise embodiments, and that various other changes and modifications may be made by one skilled in the art without departing from the scope or spirit of the invention.

What is claimed is:

1. A method of monitoring mobile telephone usage of an account comprising at least one primary account and at least one sub-account, the method comprising the steps of:
   relaying usage information pertaining to one or more mobile telephones comprising at least one of at least one primary account and at least one sub-account to one or more other mobile telephones comprising said at least one primary account; and
   facilitating said at least one primary account to monitor mobile telephone usage of said one or more mobile telephones comprising at least one of at least one primary account and at least one sub-account, wherein said at least one sub-account is associated with a telephone that is different than a telephone that is primarily associated with said at least one primary account.

2. The method of claim 1, wherein the usage information comprises one or more of use duration, use count, minutes remaining in calling plan, text message content, telephone numbers to which calls were placed, telephone numbers from which calls were received, telephone numbers to which text messages were sent, telephone numbers from which text messages were received, electronic mail addressed to which text messages were sent and electronic mail addresses from which text messages were received.

3. The method of claim 1, wherein the information is relayed to the one or more other mobile telephones comprising said at least one primary account by a network service provider.

4. The method of claim 1, wherein the usage information is relayed to a plurality of primary accounts, two or more of which share usage information with each other.

5. The method of claim 1, further comprising the step of determining that the one or more mobile telephones comprising at least one of at least one primary account and at least one sub-account are part of a shared account.

6. An apparatus for monitoring mobile telephone usage, the apparatus comprising:
   a memory; and
   at least one processor, coupled to the memory, operative to:
   relay usage information pertaining to one or more mobile telephones comprising at least one of at least one primary account and at least one sub-account to one or more other mobile telephones comprising said at least one primary account; and
   facilitate said at least one primary account to monitor mobile telephone usage of said one or more mobile telephones comprising at least one of at least one primary account and at least one sub-account, wherein said at least one sub-account is associated with a telephone that is different than a telephone that is primarily associated with said at least one primary account.

7. An article of manufacture for monitoring mobile telephone usage, comprising a machine readable medium containing one or more programs which when executed implement the steps of:
   relaying usage information pertaining to one or more mobile telephones comprising at least one of at least one primary account and at least one sub-account to one or more other mobile telephones comprising said at least one primary account; and
   facilitating said at least one primary account to monitor mobile telephone usage of said one or more mobile telephones comprising at least one of at least one primary account and at least one sub-account, wherein said at least one sub-account is associated with a telephone that is different than a telephone that is primarily associated with said at least one primary account.

8. A method of monitoring mobile telephone usage, the method comprising the steps of:
   obtaining usage information pertaining to one or more mobile telephones comprising at least one of at least one primary account and at least one sub-account;
   presenting the usage information to at least one user comprising said at least one primary account; and
   facilitating said at least one user to monitor mobile telephone usage of said one or more mobile telephones comprising at least one of at least one primary account and at least one sub-account, wherein said at least one sub-account is associated with a telephone that is different than a telephone that is primarily associated with said at least one primary account.

9. The method of claim 8, wherein the usage information is presented to the at least one user through a user-definable interface.

10. The method of claim 8, wherein the usage information is presented to the at least one user through a user-definable interface comprising one or more of a visual display and an audio display.

11. The method of claim 10, wherein the usage information is presented via an internet connection.

12. The method of claim 8, wherein the usage information is presented to the at least one user through a user-definable visual display comprising one or more of bar charts, pie charts, graphs, tables and numerical displays.

13. The method of claim 12, wherein the usage information is presented on a display portion of a mobile telephone.

14. The method of claim 8, wherein the usage information is presented to the at least one user through a user-definable audio display comprising one or more of spoken words, tones and audible code.

15. The method of claim 8, further comprising the step of the at least one user modifying mobile telephone service based at least in part on the usage information.

16. A mobile telephone, comprising:
   a memory; and
   at least one processor, coupled to the memory, operative to:
   obtain usage information pertaining to one or more mobile telephones comprising at least one of at least one primary account and at least one sub-account;
   present the usage information to at least one user comprising said at least one primary account; and
   facilitate said at least one user to monitor mobile telephone usage of said one or more mobile telephones comprising at least one of at least one primary account and at least one sub-account, wherein said at least one sub-account is associated with a telephone that is different than a telephone that is primarily associated with said at least one primary account.

17. The mobile telephone of claim 16, wherein the usage information is presented to the at least one user through a user-definable interface comprising one or more of a visual display and an audio display.

18. The mobile telephone of claim 16, wherein the usage information is presented to the at least one user though a user-definable visual display comprising one or more of bat charts, pie charts, graphs, tables and numerical displays.

19. The mobile telephone of claim 16, wherein the usage information is presented to the at least one user through a user-definable audio display comprising one or more of spoken words, tones and audible code.

20. The mobile telephone of claim 18, wherein the usage information is presented on a display of said mobile telephone.

* * * * *

UNITED STATES PATENT AND TRADEMARK OFFICE
CERTIFICATE OF CORRECTION

PATENT NO. : 7,280,816 B2  Page 1 of 1
APPLICATION NO. : 11/022159
DATED : October 9, 2007
INVENTOR(S) : Fratti et al.

It is certified that error appears in the above-identified patent and that said Letters Patent is hereby corrected as shown below:

In Column 9, line 9, "bat" should be corrected to read --bar--.

Signed and Sealed this

Twenty-seventh Day of May, 2008

JON W. DUDAS
*Director of the United States Patent and Trademark Office*